United States Patent [19]

Ichiyoshi

[11] Patent Number: 4,833,696
[45] Date of Patent: May 23, 1989

[54] SYSTEM FOR CONTROLLING OPERATION MODE OF MODULATOR/DEMODULATOR

[75] Inventor: Osamu Ichiyoshi, Tokyo, Japan

[73] Assignee: NEC Corporation, Tokyo, Japan

[21] Appl. No.: 847,366

[22] Filed: Apr. 2, 1986

[30] Foreign Application Priority Data

Apr. 9, 1985 [JP] Japan ............................. 60-75131

[51] Int. Cl.[4] ............................................. H04L 23/00
[52] U.S. Cl. ........................................ 375/121; 375/8; 371/69
[58] Field of Search .................... 375/7, 8, 5, 121, 46; 455/142, 143; 329/1, 2; 332/1; 340/825.56; 379/98; 371/69

[56] References Cited

U.S. PATENT DOCUMENTS

| | | | |
|---|---|---|---|
| 3,688,197 | 8/1972 | Kahn | 455/142 |
| 4,055,808 | 10/1977 | Holsinger et al. | 375/8 |
| 4,128,809 | 12/1978 | Kage | 375/100 |
| 4,156,867 | 5/1979 | Bench et al. | 375/5 |
| 4,177,428 | 12/1979 | Klank | 455/143 |
| 4,387,440 | 6/1983 | Eaton | 364/900 |
| 4,471,485 | 9/1984 | Pevot et al. | 371/35 |
| 4,481,489 | 11/1984 | Kurby | 375/5 |
| 4,549,302 | 10/1985 | Heatherington | 379/98 |
| 4,620,294 | 10/1986 | Leung et al. | 375/46 |

Primary Examiner—Robert L. Griffin
Assistant Examiner—Stephen Chin
Attorney, Agent, or Firm—Sughrue, Mion, Zinn, Macpeak & Seas

[57] ABSTRACT

A modulator/demodulator operation mode control system specifies an operation mode, which is a combination of particular data transmission rate, multi-phase PSK modulation system, error-correction coding rate and others, in which a modulator/demodulator is to operate, while deciding the operation mode and controlling the modulator/demodulator. A transmit station designates a particular operation mode in a plurality of bits in terms of polarities of unique words, while a receive station switches a demodulator thereof to the designated operation mode responsive to an output of mode switchover signal decision means and based on signal representative of detection of the unique words.

2 Claims, 4 Drawing Sheets

Fig. 1 PRIOR ART
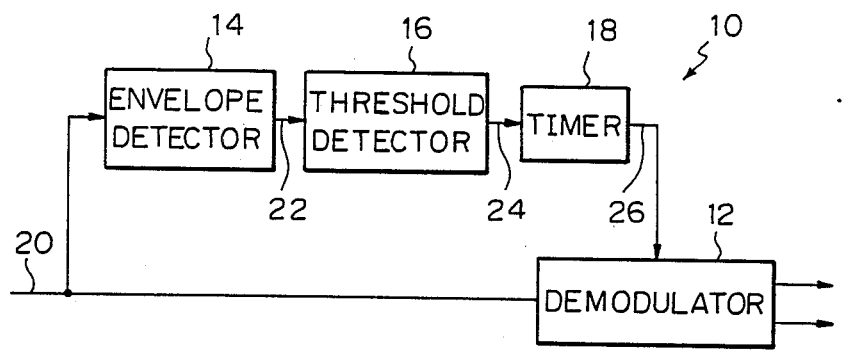
Fig. 2A PRIOR ART — RECEIVE SIGNAL 20
Fig. 2B PRIOR ART — ENVELOPE DETECTOR OUTPUT 22
Fig. 2C PRIOR ART — THRESHOLD DETECTOR OUTPUT 24
Fig. 2D PRIOR ART — TIMER OUTPUT 18
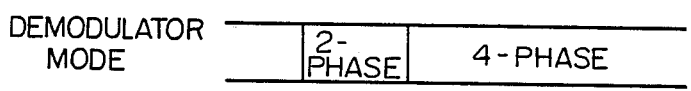
Fig. 2E PRIOR ART — DEMODULATOR MODE Fig. 3 PRIOR ART
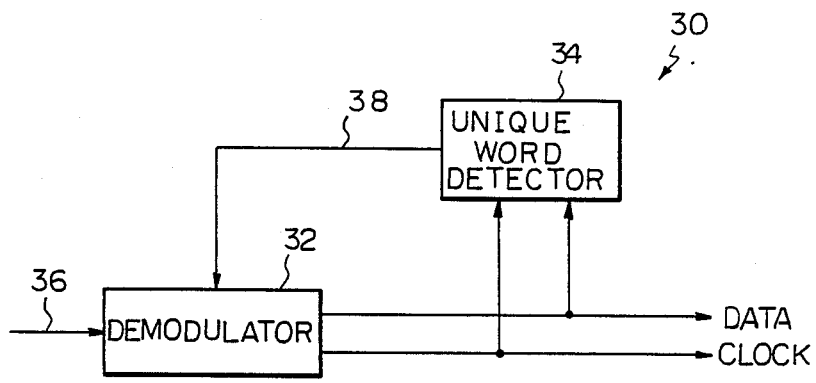
Fig. 4A PRIOR ART RECEIVE SIGNAL 36
Fig. 4B PRIOR ART UNIQUE WORD DETECTOR OUTPUT 38
Fig. 4C PRIOR ART DEMODULATOR MODE

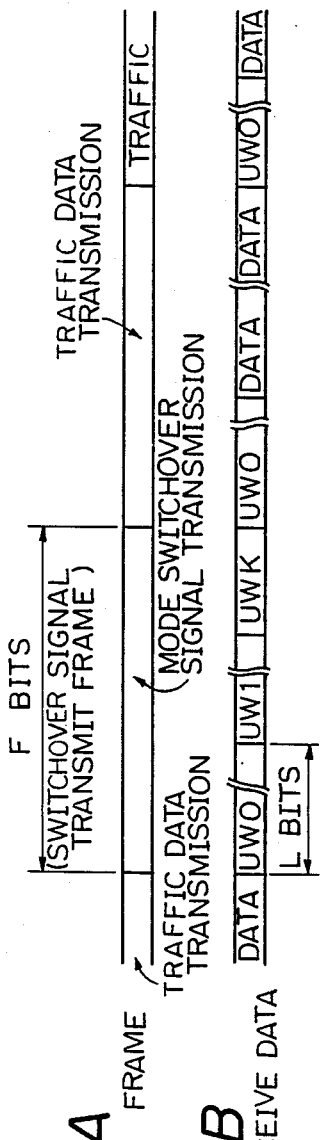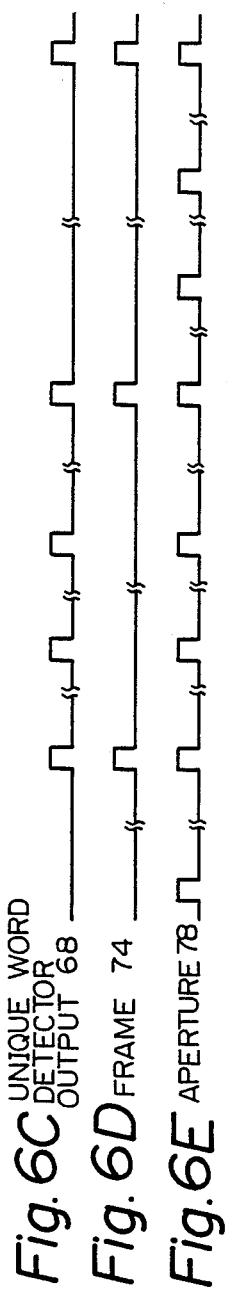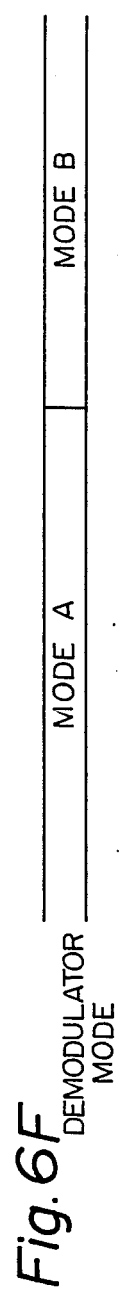

SYSTEM FOR CONTROLLING OPERATION MODE OF MODULATOR/DEMODULATOR

BACKGROUND OF THE INVENTION

The present invention relates to a system for controlling an operation mode of a modulator/demodulator which is applicable to satellite communication. More particularly, the present invention is concerned with an operation mode control system for a modulator/demodulator useful for business communication and mobile communication of the kind using high frequency bands such as a Ku band, which is a promising high frequency band.

Satellite communication, compared to ground communication, requires a modulator/demodulator which is operable under lower signal-to-noise (SN) ratio conditions because it cannot avoid attenuation due to far longer transmission links. Especially, a demodulator for phase modulation adapted for synchronous detection has to positively tune a carrier recovery circuit at a sufficiently high SN ratio. One approach known in the art to meet this requirement is using a modulator switchover system which causes a modulator to perform two-phase PSK (phase shift keying) demodulation for a preamble signal and four-phase PSK demodulation for a transmit signal. Such a switchable demodulator scheme is disclosed in, for example, Japanese Patent Publication Nos. 53-23649 (U.S. Pat. No. 3,815,034) and 58-55709 which respectively are entitled "Phase-Modulated Wave Demodulator" and "Phase Demodulator".

The prior art systems will be described with reference to the accompanying drawings. In FIG. 1, a prior art system is shown and generally designated by the reference numeral 10. The system 10 comprises a demodulator 12, an envelope detector 14, a threshold detector 16, and a timer 18. A receive signal 20 which is applied to the system 10 has a format as shown in FIG. 2A. Output signals 22, 24 and 26 of the envelope detector 14, threshold detector 16 and timer 18, respectively, have waveforms as shown in FIGS. 2B, 2C and 2D. The demodulator 12 is selectively operable in different modes as shown in FIG. 2E. As shown in FIGS. 2A-2E, when arrival of a signal has been detected in a no-signal condition, the demodulator 12 is caused to operate in a two-phase PSK mode and then in a four-phase PSK mode. Another prior art system is shown in FIG. 3. In FIG. 3 the system, generally 30, comprises a demodulator 32 and a unique word detector 34. A receive signal 36 which enters the system 30 has a format as shown in FIG. 4A. The output signal 38 of the unique word detector 34 is shown in FIG. 4B, and the operation modes of the demodulator 32 are shown in FIG. 4C. It will be seen that in this particular prior art system 30 on detection of a unique word the operation mode of the demodulator 32 is switched from a two-phase to a four-phase PSK mode.

The problem with the prior art system 10 of FIGS. 1 and 2A-2E, which detects an envelope and then a threshold value, is that it is liable to perform faulty detection under low SN ratio conditions. Meanwhile, the prior art system 30 of FIGS. 3 and 4A-4E has the drawback that if it overlooks a unique word even once, the communication is practically disenabled from the start.

While any of the prior art systems discussed above allows the demodulator to operate in a two-phase PSK mode during an initial stage of operation and a four-phase mode during a steady communication stage, communication of the kind keenly demanded today for business transactions uses a modulator/demodulator which is operable in a far greater number of operation modes. For example, the following factors are used in various combinations:

| Data rate: | 4.8 Kb/sec | |
| | 9.6 Kb/sec | Low |
| | 32 Kb/sec | |
| | 64 Kb/sec | |
| | 1.544 Mb/sec | Medium |
| | 10 Mb/sec | |
| | 60 Mb/sec | High |
| | 120 Mb/sec | |
| Modulation system: | 2-phase PSK | |
| | 4-phase PSK | |
| | 8-phase PSK | |
| Error-correcting coding rate: | ½ | |
| | ⅔ | |
| | ¾ | |
| | ⅞ | |

It is remarkably effective to combine various modes as stated above so that one may hold a communication with an optimum modulation system selected on the basis of user's signal conditions (voice, data), SN ratio of the transmission path (attenuation due to rain, etc.), frequency band in use (Ku band, C band, etc.), and others. Although such may be implemented utilizing order wires of a TDMA (time division multiple access) communication system, installing order wires in business communication, mobile communication and others which involve numerous users is undesirable because the order wires would reduce the system capacity available for communication. Moreover, any of the prior art systems shown and described is incapable of controlling a modulator/demodulator having a great number of different operation modes as previously mentioned.

SUMMARY OF THE INVENTION

It is therefore an object of the present invention to provide a modulator/demodulator operation mode control system which is capable of controlling a modulator/demodulator having numerous operation modes.

It is another object of the present invention to provide a modulator/demodulator operation mode control system which eliminates the need for order wires otherwise required for control, surely operates even in a low SN ratio condition, and adapts itself to both synchronous detection and asynchronous detection.

It is another object of the present invention to provide a system for controlling an operation mode of a modulator/demodulator.

In accordance with the present invention, in a system for controlling an operation mode of a modulator/demodulator which switches over the operation mode of the modulator/demodulator responsive to a particular combination of modulation system, error-correction coding system and data transmission rate, when the operation mode is switched from one to another, a transmit station generates a plurality (K) of unique words after a unique word for synchronization, which is transmitted for each frame, and then modulates polarities of the K unique words to transmit K-bits of binary data to thereby designate a modulation mode which is to hold next, while a receive station discriminates a switchover when more than a predetermined number of the unique words have been received within a predetermined period of time and identifies the modulation mode based on the K-bits of binary data.

The above and other objects, features and advantages of the present invention will become more apparent from the following detailed description taken with the accompanying drawings.

BRIEF DESCRIPTION OF THE DRAWINGS

FIG. 1 is a block diagram showing an example of prior art systems for controlling operation mode of a modulator/demodulator;

FIGS. 2A–2E show waveforms representative of operation of the system shown in FIG. 1;

FIG. 3 is a block diagram showing another example of the prior art systems;

FIGS. 4A–4C show waveforms representative of operation of the system shown in FIG. 3;

FIGS. 6A–6F show waveforms demonstrating operation of the system of FIG. 5.

DESCRIPTION OF THE PREFERRED EMBODIMENT

Figure 5:
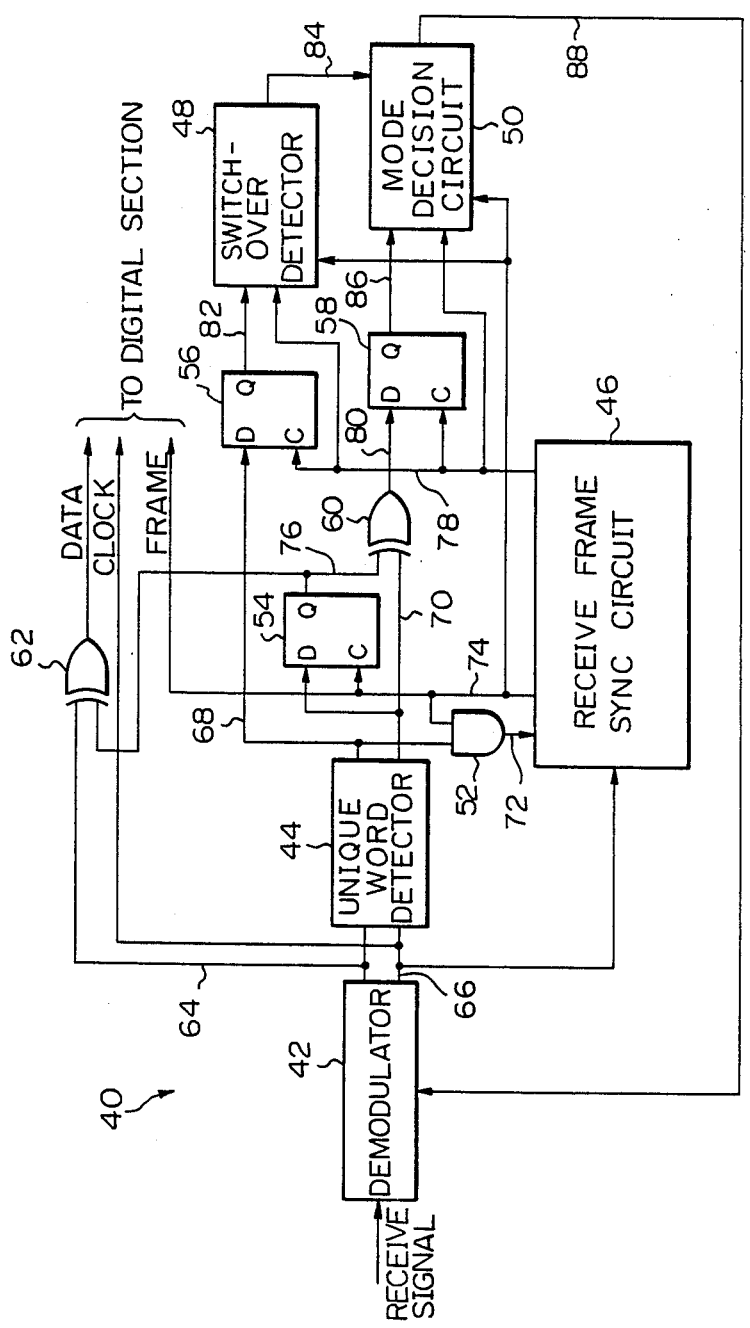
FIG. 5 is a block diagram a modulator/demodulator operation mode control system embodying the present invention.

While the system for controlling the operation mode of a modulator/demodulator of the present invention is susceptible of numerous physical embodiments, depending upon the environment and requirements of use, a substantial number of the herein shown and described embodiment have been made, tested and used, and all have performed in an eminently satisfactory manner.

A modulator/demodulator operation mode control system of the present invention is shown in FIG. 5 and signals appearing therein, in FIGS. 6A–6F.

Referring to FIG. 5, the system, generally 40, comprises a demodulator 42, a unique word detector 44, a receive frame synchronizing circuit 46, a switchover detector 48, a mode decision circuit 50, an AND gate 52, D-type flop-flops 54, 56 and 58, and Exclusive-OR gates 60 and 62. One output 64 of the demodulator 42 is applied to one input terminal of the unique word detector 44 and the Exclusive-OR gate 62, while the other output 66 is applied to the receive frame synchronizing circuit 46 and the other input terminal of the unique word detector 44. At the same time, the demodulator output 66 is routed to a digital section as a clock. One output 68 of the unique word detector 44 is fed to the D flip-flop 56 and the AND gate 52, while the other output 70 is fed to the Exclusive-OR gate 60 and a D-terminal of the flip-flop 54. The output 72 of and AND gate 52 is coupled to the receive frame synchronizing circuit 46. One output 74 of the circuit 46 in turn is routed to the AND gate 52, a C-terminal of the D flip-flop 54, the mode decision circuit 50 and the switchover detector 48, while being delivered to the digital section is a frame output. The output of the D flip-flop 54 is applied to the Exclusive-OR gate 60 and the Exclusive-OR gate 62 which is adapted to apply data to the digital section. The other output 78 of the receive frame synchronizing circuit 46 is fed to the mode decision circuit 50, the D flip-flops 56 and 58, and the switchover detector 48. The output 80 of the Exclusive-OR gate 60 is coupled to a D-terminal of the D flip-flop 58. The output 82 of the D flip-flop 56 is inputted to the mode decision circuit 50 as an output 84 of the switchover detector 48. Further, the output 86 of the D flip-flop 58 is fed back to the demodulator 42 by way of the mode decision circuit 50.

As shown in FIGS. 6A and 6B, in accordance with the illustrative embodiment, a switchover signal is implemented with an F-bit signal which is a sequence of K unique words, each of which has L bits. It will be noted that if K·L<F the switchover signal will be fully transmitted within one frame but, if otherwise, the switchover signal will occupy a plurality of frames. The system 40 shown in FIG. 5 is assumed to use a synchronous detection type demodulator. A "unique word for synchronization" 70 outputted by the unique word detector 44, i.e., unique word $UW_0$ is detected responsive to a "frame pulse" 74 which is outputted by the receive frame synchronizing circuit 46, thereby providing an "ambiguity remove signal" 76. The Exclusive-OR gate 60 to which the signal 76 is applied produces a unique pattern polarity signal 80 which is free from "ambiguity". The signal 80 is discriminated responsive to an "aperture pulse" 78 and then applied to the mode decision circuit 50. Meanwhile, a "unique word detection signal" (not dependent upon polarity) 68 is also discriminated responsive to an aperture pulse 78 and then fed to the switchover detector 48. The switchover detector 48 determines that a switchover signal frame has been received when, of the K unique words expected to arrive in the case of a switchover signal, more than a predetermined number (e.g. T) of unique words have occurred. On detection of a switchover signal, the mode decision circuit 50 decodes a mode instruction signal and then generates a "demodulator mode control signal" 88 to start controlling the demodulator 42 in a new mode at a predetermined timing.

The system 40 having the above construction will be operated as follows.

When changing the operation mode is decided, a transmit station subjects a plurality (K) of unique words UW, $UW_1$, $UW_2$, ..., $UW_k$, which are to be transmitted after a synchronizing unique word ($UW_0$ in this particular embodiment) that appears for each frame, to "polarity modulation" in order to send K-bit binary data which designates a modulation mode to hold next. Simultaneously, the transmit station switches over the transmission mode at the beginning of the next frame or at any other predetermined timing.

A receive station, on the other hand, samples and stores presence of unique words as well as polarity detection signals responsive to a timing signal, which is supplied thereto from the receive frame synchronizing circuit 46. When the receive station has detected more than a predetermined number of unique words within a predetermined period of time, it determines that a switchover signal has been received, then decodes the binary code as represented by the stored polarity detection signals to thereby select an operation mode of the demodulator 42 which is to hold next, and then switches the demodulator mode at the beginning of the next frame or at any other predetermined timing.

As described above, the system 40 is capable of surely changing the operation mode even when the SN ratio is poor. Specifically, concerning the detection of a unique word itself (assumed to have a length of L bits), there are provided L bits which is long enough to be detected even under poor SN ratio conditions, a word having high self-correlation, and an allowable number of error bits (with a threshold value Δ), so that the unique word detection error rate is sufficiently lower than the bit error rate. Even though the number of bit errors in the unique word may exceed the threshold value to such an extent that a unique word is overlooked, the probability of failing to correctly decide polarity (decision by majority of L/2) is negligible.

The sampling which uses aperture pulses as previously stated is effective to substantially exclude erroneous detection pulses which may appear even during steady operation due to accidental coincidence between an L-bit signal included in random transmit signals and the unique word. By adequately selecting the code length K which is an important constant in switchover detection and an allowable number of overlooks, it is possible to suppress the probability of malfunction of the system due to detection error to a practically negligible degree.

In accordance with the present invention, a modulator/demodulator furnished with numerous operation modes is surely operable even under poor SN ratio conditions without the need for order wires and whenever desired and in any desired mode. This offers users who use various different signal modes high-speed and highly reliable signal transmission services by setting up an optimum operation mode, i.e., a combination of data rate, modulation system, error-correcting coding rate and others which is most effective for given transmission conditions. The present invention allows a versatile, flexible and high-performance satellite communication link to be set up which is extensively applicable to business communication and mobile communication.

Various modifications will become possible for those skilled in the art after receiving the teachings of the present disclosure without departing from the scope thereof.

What is claimed is:

1. A system for controlling an operation mode of a modulator/demodulator, said modulator/demodulator operating in one of a plurality of operation modes in accordance with at least a data transmission rate, an error-correction coding rate, and multi-phase shift keying modulation conditions, said system comprising:
   means for receiving a first signal which contains traffic data and a switchover signal, said switchover signal including K unique digital words indicative of a desired one of said operation modes of said modulator/demodulator, where K is a positive integer, and a synchronizing unique word, wherein each of said unique digital words and said synchronizing unique word is L bits long, where L is a positive integer, K and L being sufficiently large that a unique word detection error rate is sufficiently lower than a bit error rate to enable accurate detection even in poor signal-to-noise conditions;
   means for detecting said K unique digital words and outputting a detection signal when one of said K unique digital words is received; and
   means, responsive to said detection signal, for altering said operation mode of said modulator/demodulator,
   wherein said operation mode is controlled in a manner substantially unaffected by adverse signal-to-noise ratio conditions under which said first signal is transmitted.

2. A system as claimed in claim 1, wherein said means for altering said operation mode comprises:
   means for determining whether more than a predetermined number of said unique digital words have been received and for detecting a switchover of operation modes when said predetermined number have been received; and
   means for selecting a particular one of said plurality of operation modes in accordance with an output of said switchover detection means.

* * * * *